Jan. 12, 1960  P. H. LANGE  2,920,507
SPINDLE-MOVING MECHANISM
Filed May 18, 1955  2 Sheets-Sheet 1

INVENTOR.
PAUL H. LANGE
BY
*Paul M. Fist*
ATTORNEY

Jan. 12, 1960  P. H. LANGE  2,920,507
SPINDLE-MOVING MECHANISM
Filed May 18, 1955  2 Sheets-Sheet 2

INVENTOR.
PAUL H. LANGE
BY
ATTORNEY

United States Patent Office
2,920,507
Patented Jan. 12, 1960

2,920,507

SPINDLE-MOVING MECHANISM

Paul H. Lange, Bridgeport, Conn., assignor to The Bullard Company, a corporation of Connecticut Application May 18, 1955, Serial No. 509,166

3 Claims. (Cl. 77—3)

The present invention relates to machine tools, and particularly to a new and improved combined power and manually-operable means for axially moving a rotatable spindle of a horizontal boring mill.

The principal object of this invention is to provide a manually-operable mechanism for axially moving the rotatable spindle of a horizontal boring mill that will be ineffective when the power means for axially moving said spindle is effective; the provision of such a manually-operable mechanism wherein a hand wheel is drivingly connected to a power operated screw through an intermediate mechanism that can be utilized to bodily move the rotatable spindle axially, as well as the power-operated screw therefor; the provision of such a manually-operable mechanism wherein the intermediate mechanism comprises a rack and pinion device that is adapted hydraulically to be rendered effective or ineffective; and the provision of such a manually-operable device wherein a combined rack and pinion and screw means provides the manual and power movements of the rotatable spindle of a horizontal boring mill.

The above, other objects and novel features of the invention will become apparent from the following specification and the accompanying drawings, in which.

While the principles of the invention are applicable to the manual movement of any rotatable axially-movable spindle of a machine tool, they are shown and will be described as applied to the spindle of a horizontal boring mill of the type shown, described and claimed in application Serial No. 458,110 filed September 24, 1954, in the name of Claude M. Grinage, now Patent No. 2,887,906, to which patent reference is directed for specific features not specifically described in the present application.

Figure 1:
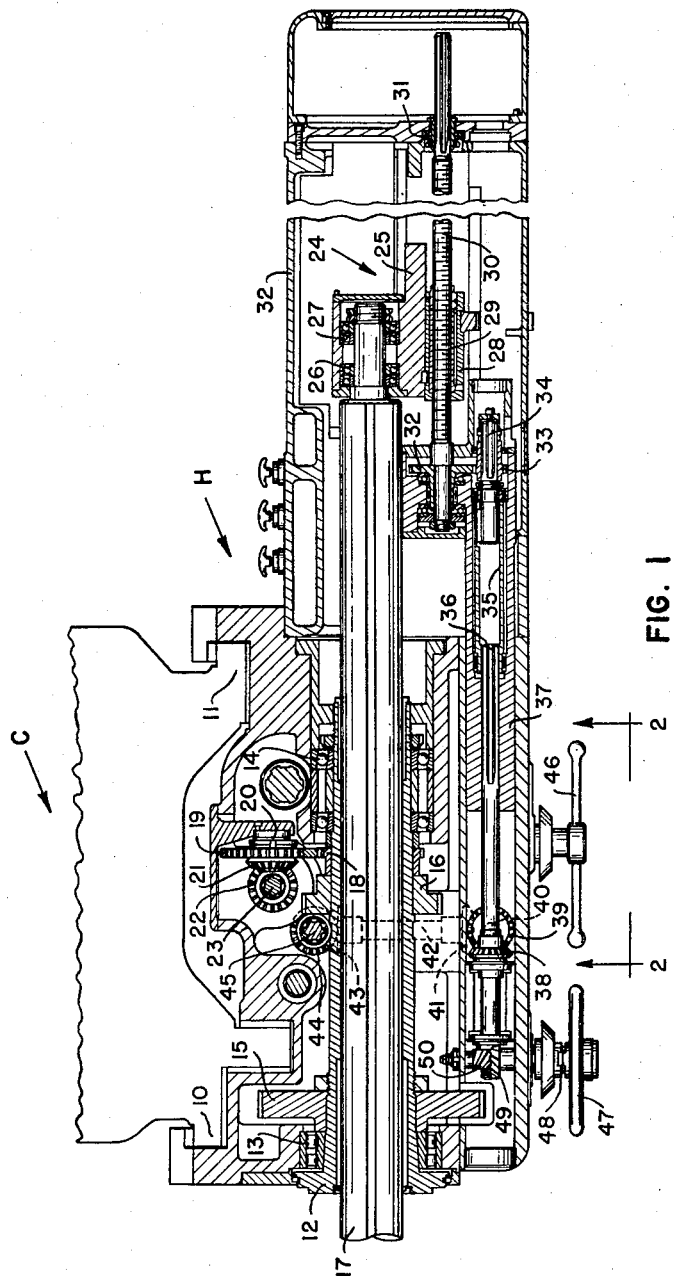
Figure 1 is a horizontal sectional view partly in plan through a portion of the head of a horizontal boring mill including the rotatable axially-movable spindle thereof.

Referring to Fig. 1, the vertical column C of a horizontal boring mill is adapted to support a head H for vertical movement along ways 10 and 11. The head H is adapted to support a hollow sleeve member 12 within bearings 13 and 14, axially aligned and located within the head H. Gears 15 and 16 are fixed to the hollow sleeve 12 and comprise high- and low-speed ranges of rotation for the sleeve 12. Power is supplied to the gears 15 and 16 from the headstock transmission all as more fully described within the above-referred-to patent. A spindle 17 is splined within the hollow sleeve 12 for axial movement. Also fixed to the sleeve 12 is a gear 18 that meshes with a gear 19 on a back shaft 20. The shaft 20 supports a bevel pinion 21 that meshes with a corresponding bevel pinion 22 splined to a vertically-disposed shaft 23 that leads to the input of the feedworks of the horizontal boring mill, all as more clearly described in the above-referred-to patent. In this way, the feedworks transmission is driven in a direct relationship to the rotation of the sleeve 12 as is common in the art.

Axially feeding movement of the shaft 17 is effected through a threaded nut construction 24 which includes a non-rotatable housing 25 that supports anti-friction bearings 26 and 27 for the tail end of the shaft 17. The housing 25 is fixed to a bracket 28 in which is mounted a threaded nut member 29. A shaft 30 is threaded into the nut member 29 and extends rearwardly thereof cooperating through a splined connection with a bearing 31 mounted within a housing 32 attached to the head H.

The forward end of the shaft 30 has a spur gear 32 fixed thereto that meshes with a spur gear 33 keyed to a stub shaft 34. A hollow sleeve 35 is keyed to the stub shaft 34 and is splined to a drive shaft 36 mounted within the head H. The splined shaft 36 is journaled in a tubular bracket or sleeve 37 that supports the forward end of the threaded shaft 30.

Splined shaft 36 is provided with a bevel gear 38 that meshes with a corresponding bevel gear 39 fixed to a vertical shaft 40, to the bottom of which another bevel gear is fixed (not shown). This latter bevel gear meshes with a bevel pinion 41 that is fixed to a cross shaft 42. The back end of shaft 42 has fixed to it a bevel pinion 43 in mesh with a corresponding bevel pinion 44 that is splined to a vertically-disposed shaft 45. The splined shaft 45 is adapted to receive the various rates of rotation from the feedworks of the horizontal boring mill all as more fully described in the above-referred-to patent.

From the foregoing, it is evident that the rotation of the splined shaft 45 will cause rotation of the threaded shaft 30 to effect reciprocable motion of the nut member 29 as well as bracket 28, and thereby cause axial movement of the spindle 17 at a rate and direction depending upon the rate and direction of rotation of the vertically-disposed splined shaft 45.

Figure 3:
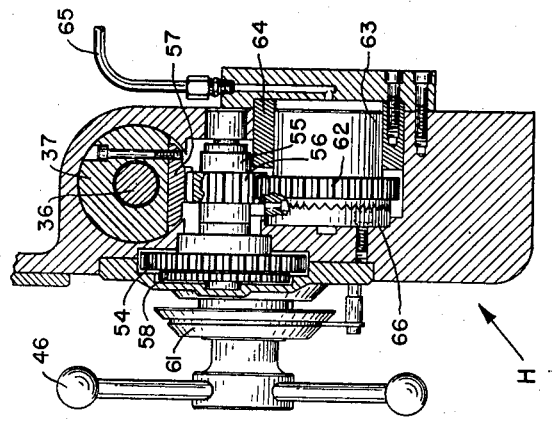
Fig. 3 is a sectional elevational view taken substantially along line 3—3 of Fig. 2.
Figure 2:
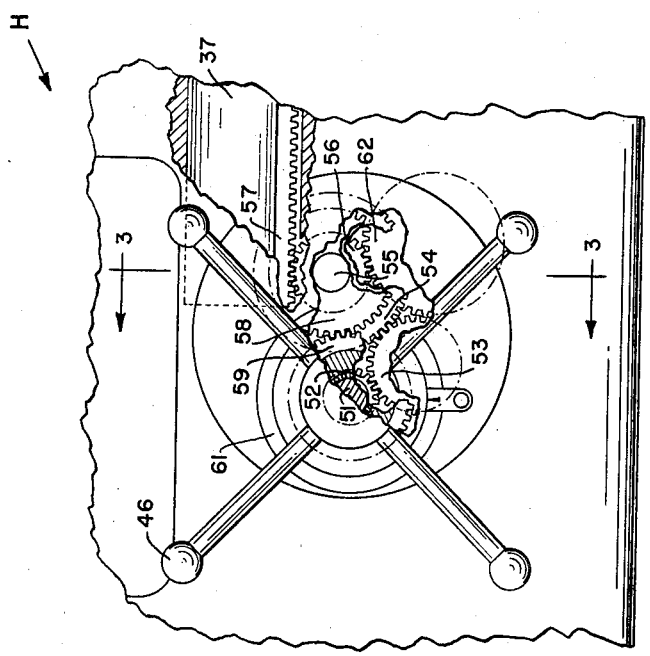
Fig. 2 is an elevational view, partly in section as seen by looking in the direction of the arrow along line 2—2 of Fig. 1.

Referring to Figs. 2 and 3, the shaft 17 is adapted manually to be moved at a relatively rapid rate and a slow rate by the operation of two hand wheels 46 and 47 (Fig. 1). The hand wheel 47 is provided with a releasable hammer connection 48 constructed so that rotation of the splined shaft 36 by shaft 45 will not rotate hand wheel 47. However, forcing the hand wheel 47 inwardly causes the connection 48 to become effective, and subsequent turning of the hand wheel 47 causes turning of a gear 49 fixed to the shaft supporting the hand wheel 47. The gear 49 meshes with a gear 50 fixed to the one end of the splined shaft 36. Accordingly, turning of the hand wheel 47 with connection 48 effective causes rotation of the splined sleeve 35 as well as the gears 32 and 33, thereby rotating the threaded shaft 30 and causing relatively slow axial movement of the shaft 17.

Relatively rapid manual movement of the shaft 17 is effected by the rotation of the hand wheel 46. Referring to Fig. 2, the hand wheel 46 is fixed to a stub shaft 51. A spur gear 52 is likewise fixed to the shaft 51, and it meshes with a spur gear 53 journaled on a stub shaft within the head H. The gear 53 is in mesh with a spur gear 54 that is fixed to a shaft 55 (Fig. 3) also located in the head H. The shaft 55 is provided with a spur gear 56 that meshes with a rack 57 fixed to the bottom of a tubular member 37 (Fig. 1). An additional spur gear 58 is fixed to the shaft 55, and it meshes with a similar spur gear 59 journaled on the shaft 51 (Fig. 2). The gear 59 is fixed to a dial 61 that is likewise journaled on the shaft 51. The dial 61 accordingly indicates the movement of the tubular member 37 when the latter is moved by the rack 57.

In order to lock the spur gear 56 and, consequently, the tubular member 37 against axial movement when it is desired to move the shaft 17 through the action of the nut 29 on the threaded shaft 30, a locking gear 62 (Fig. 3) is fixed to a piston 63 within a cylinder 64 that is adapted to be supplied with liquid under pressure through an inlet 65. A stationary ratchet member 66 is fixed to the head H and its teeth mesh with ratchet teeth on the piston 63. The construction and arrangement of the parts are such that introduction of pressure liquid into the cylinder 64 causes the piston 63 to move leftwardly (Fig. 3) whereupon the ratchet teeth between the piston 63 and the member 66 intermesh, preventing the rotation of the locking gear 62. When it is desired manually to move the shaft 17 through the action of the rotation of the hand wheel 46, inlet 65 is exhausted and consequently the cylinder 64 is exhausted through a valve (not shown). Turning the hand wheel 46 causes the camming action of the ratchet teeth between the member 66 and the piston 63 to move the piston rightwardly (Fig. 3) so that the ratchet teeth clear each other. Rotation of the hand wheel 46 can then be accomplished to effect the longitudinal movement of the tubular member 37 and, consequently, the movement of the shaft 17.

Although the various features of the improved spindle-moving mechanism have been shown and described in detail to fully disclose one embodiment of the invention, it will be evident that numerous changes may be made in such details, and certain features may be used without others, without departing from the principles of the invention.

What is claimed is:

1. Apparatus comprising in combination, a rotatable, axially movable spindle; a nut connected to said spindle for axial movement therewith; a screw threaded into said nut; a sleeve connected to said spindle; a member in telescoping relation with said sleeve; a driving connection between said telescoping member and said screw; rack means on said sleeve; pinion means in meshing relation with said rack means; means for providing relative rotation between said nut and screw; and separate means for rotating said pinion.

2. Apparatus comprising in combination, a rotatable, axially movable spindle; a nut connected to said spindle for axial movement therewith; a screw threaded into said nut; a sleeve connected to said spindle; a member in telescoping relation with said sleeve; a driving connection between said telescoping member and said screw; rack means on said sleeve; pinion means in meshing relation with said rack means; hydraulic means for rendering said rack and pinion means effective and ineffective; means for providing relative rotation between said nut and screw; and separate means for rotating said pinion.

3. Apparatus comprising in combination, a rotatable, axially movable spindle; a nut connected to said spindle for axial movement therewith; a screw threaded into said nut; a sleeve connected to said spindle; a member in telescoping relation with said sleeve; a driving connection between said telescoping member and said screw; rack means on said sleeve; pinion means in meshing relation with said rack means; a rotatable piston having a gear fixed thereto in mesh with said pinion; means for preventing the rotation of said piston upon the application of hydraulic pressure thereto; means for providing relative rotation between said nut and screw; and separate means for rotating said pinion.

References Cited in the file of this patent

UNITED STATES PATENTS

| | | |
|---|---|---|
| 282,750 | Miller | Aug. 7, 1883 |
| 283,857 | Box | Aug. 28, 1883 |
| 2,510,330 | Claus et al. | June 6, 1950 |
| 2,672,773 | Schofield | Mar. 23, 1954 |